United States Patent [19]
Kondo

[11] Patent Number: 4,729,021
[45] Date of Patent: Mar. 1, 1988

[54] HIGH EFFICIENCY TECHNIQUE FOR CODING A DIGITAL VIDEO SIGNAL

[75] Inventor: Tetsujiro Kondo, Kanagawa, Japan

[73] Assignee: Sony Corporation, Tokyo, Japan

[21] Appl. No.: 925,376

[22] Filed: Oct. 30, 1986

[30] Foreign Application Priority Data

Nov. 5, 1985 [JP] Japan .................................. 60-247840

[51] Int. Cl.[4] .............................................. H04W 7/12
[52] U.S. Cl. ..................... 358/135; 358/136; 358/105
[58] Field of Search ................ 358/105, 136, 135, 133

[56] References Cited

U.S. PATENT DOCUMENTS

| 4,371,895 | 2/1983 | Koga | 358/105 X |
| 4,575,756 | 3/1986 | Furukawa | 358/136 |
| 4,656,511 | 4/1987 | Koga | 358/105 X |

Primary Examiner—James J. Groody
Assistant Examiner—Victor R. Kostak
Attorney, Agent, or Firm—Lewis H. Eslinger; Alvin Sinderbrand

[57] ABSTRACT

A high efficiency apparatus for coding digital video data compresses the number of bits per picture element in the video data such as a digital video signal or the like is. The video data of a television picture plane is divided into a number of three-dimensional blocks, i.e., spatial blocks. The picture element data in the block can be coded using a reduced number of bits by bit compression by performing a coding process adapted to the narrowed dynamic range on the basis of the correlation among the picture elements in each block. The transmission data has the number of bits reduced as compared with the number of bits of the original data. By coding only the necessary frames by discriminating movement of the image in the block, redundancy in the direction of time can be removed.

9 Claims, 21 Drawing Figures

HIGH EFFICIENCY TECHNIQUE FOR CODING A DIGITAL VIDEO SIGNAL

BACKGROUND OF THE INVENTION

1. Field of the Invention

The present invention relates to a high efficiency coding technique and, more particularly, to a high efficiency coding apparatus for compressing the number of bits per picture element of video data such as a digital television signal or the like.

2. Description of the Prior Art

For coding a television signal, there are several known methods of reducing the average number of bits per picture element or lowering the sampling frequency in order to narrow the transmission band.

As one of the coding methods of lowering the sampling frequency, there is proposed the method whereby the video data is thinned out by ½ by subsampling, and the subsampling point and the flag indicative of the position of the subsampling point which is used upon interpolation (namely, representing which data at the sampling point in the vertical or horizontal direction of the interpolation points is used) are transmitted.

A DPCM (differential PCM) method is known as one of the coding methods of reducing the average number of bits per picture element. In the DPCM method, attention is paid to the fact that there is a high correlation among the picture elements of the video signal so that the difference between the adjacent picture elements is small, and this difference signal is digitized and transmitted.

As another coding method of reducing the average number of bits per picture element, there is known the method whereby a picture plane of one field is divided into small blocks, and the deviation between the level of the picture element at the representative point in one block and the level distribution of the data in this block is transmitted for every block.

According to the coding method of reducing the sampling frequency by subsampling, the sampling frequency is reduced by 50%, so that there is the fear of aliasing distortion.

The DPCM method has a problem in that the coding error is propagated to the subsequent coding process.

The method of coding on a block unit basis has a drawback in that a block distortion occurs at the boundary between blocks.

The present invention is intended to provide a high efficiency coding apparatus which can eliminate the problems of aliasing distortion, propagation of error, block distortion, and the like in the foregoing conventional techniques.

The applicant of the present invention has already proposed the high efficiency coding technique as disclosed in U.S. patent application Ser. No. 809,742, in which the dynamic range which is defined by the maximum and minimum values of a plurality of picture elements included in a two-dimensional or three-dimensional block is obtained and a coding process adapted to this dynamic range is performed.

Although the above technique relates to reversible coding and has the advantage that the reproduced picture quality hardly deteriorates, it has the disadvantages such that the compression rate is not very high and there is the possibility of problems in the actual transmission.

OBJECT AND SUMMARY OF THE INVENTION

According, it is an object of the present invention to provide a high efficiency coding apparatus which can eliminate the problems of the foregoing conventional techniques, such as the occurrence of aliasing distortion, the propagation of coding error, and the occurrence of block distortion.

Another object of the invention is to provide a high efficiency coding apparatus in which the compression rate of the data is relatively high with a high fidelity.

Further another object of the invention is to provide a decoding apparatus in which the reproduced picture based on the decoded data is free from jerkiness.

According to an aspect of the present invention, plural picture fields are divided into a plurality of blocks. Each block is separately processed. First, the block's dynamic range (i.e., the difference between the maximum and minimum values of the picture elements in the block) and the minimum value are obtained.

The existence of movement within the block is discriminated by, for example, comparing the digital data of picture elements in consecutive picture fields with the block, and a discriminating code is generated. The minimum value is subtracted from each of the digital video data in a block, and modified digital video data is generated. The modified digital video data is supplied to an encoder in which fewer samples of the modified digital video data than originally existing in a block are encoded with the digitized bit number smaller than that of the modified digital video data when the discriminating code indicates that no movement exists in the block. The output of the encoder and an additional code per block formed of the discriminating code, minimum value and the dynamic range are transmitted.

According to another aspect of the present invention, a decoding apparatus decodes the data transmitted from the coding apparatus described above.

The above and other objects and features of the present invention will become apparent from the following detailed description and the appended claims with reference to the accompanying drawings.

BRIEF DESCRIPTION OF THE DRAWINGS

FIGS. 14A-14G is a schematic diagram for explaining the decoding operation; and

DESCRIPTION OF THE PREFERRED EMBODIMENTS

An embodiment of the present invention will be described in detail hereinbelow with reference to the drawings.

Figure 1:
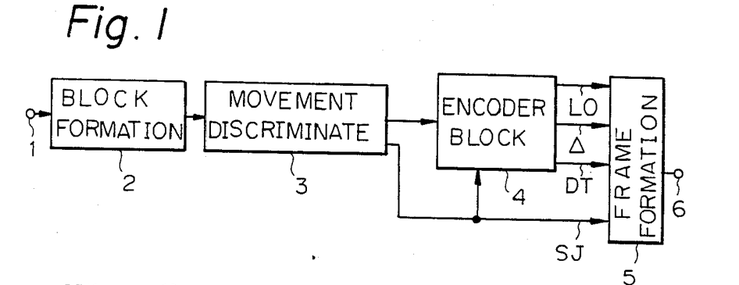
FIG. 1 is a block diagram of an embodiment of the present invention.

FIG. 1 shows an overall arrangement of a transmission side (recording side) according to the invention. A digital video signal of the NTSC system in which, for example, one sample is digitized into eight bits is input to an input terminal 1. The digital video signal is supplied to a block formation circuit 2.

The input digital video signal is converted by the block formation circuit 2 into a continuous signal for every block as a unit to be coded. The output signal of the block formation circuit 2 is supplied to a movement discriminating circuit 3. The movement discriminating circuit 3 generates a discriminating code SJ of two bits indicative of the state of movement in a three-dimensional block (in this example, 6 lines×6 picture elements×3 frames) by mutually checking the signals among the frames.

The digital video signal to be coded is also generated from the movement discriminating circuit 3 and supplied to an encoder block 4. The encoder block 4 performs the coding process adapted to the dynamic range for every block. Namely, in the encoder block 4, the maximum level MAX, minimum level MIN, and dynamic range DR of each block are calculated. A digitization (or quantization) width $\Delta$ of four bits is determined by dividing the dynamic range DR by the number of steps corresponding to the number of digitized bits and, at the same time, the representative minimum level $L_0$ of eight bits is detected. The digitization width $\Delta$ and the picture element data DTI after the minimum level is removed are digitized. The region among the divided regions in which the picture element data DTI after the removal of the minimum level is included is detected and the four-bit coding code DT which specifies the detected region is formed by digitization.

In this embodiment, the discriminating code SJ, digitization width $\Delta$, representative minimum level $L_0$, and coding code DT are transmitted. These data are supplied to a frame formation circuit 5 and converted into the transmission data.

The transmission data may have a format such that each of the data portions consisting of the discriminating code SJ, representative minimum level $L_0$, digitization width $\Delta$, and coding code DT is subjected to an independent coding process for error correction codes and a parity of each error correction code is added to each data portion. The transmission data having the above format can be used. On the other hand, each of the discriminating code SJ, digitization width $\Delta$, and representative minimum level $L_0$ other than the coding code DT can be also subjected to an independent coding process for error correction codes. Further, all of the discriminating code SJ, digitization width $\Delta$, and representative minimum level $L_0$ may be also subjected to a common coding process for an error correction code and the parity may be also added. The transmission data is taken out at an output terminal 6 of the frame formation circuit 5. Although not shown, the transmission data from the frame formation circuit 5 is transmitted (or recorded in a recording medium) as serial data.

Figure 2:
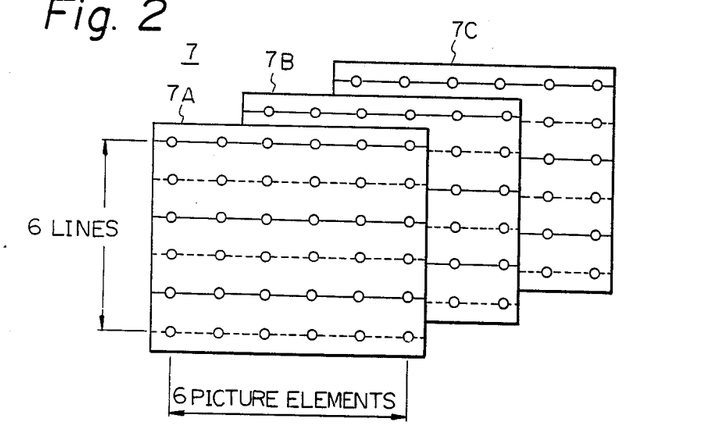
FIG. 2 is a schematic diagram for explaining a block as a unit which is subjected to a coding process.

A block as a unit to be coded will now be described with reference to FIG. 2. In FIG. 2, reference numeral 7 denotes one block consisting of two-dimensional (hereinafter, simply referred to as 2D) regions 7A, 7B, and 7C each of which belongs to a corresponding one of three frames. Solid lines indicate lines of odd-number fields and broken lines represent lines of even-number fields. Each of the regions 7A, 7B, and 7C is constituted by 36 picture elements (6 lines×6 picture elements), in which six picture elements are included in each of six lines of each frame. Therefore, one block consists of 108 (×6×3) picture elements.

One block of the original digital video signal consists of 864 bits (108×8 bits). When all frames of one block are coded, for example, fixed four bits and an additional code are added to one picture element, one block is constituted by 446 bits (=6×6×3×4 bits+14 bits). Therefore, the number of bits to be transmitted can be compressed.

As the number of digitized bits of the coding code DT is small, the redundancy can be more and more suppressed. However, to prevent an increase in digitization distortion, it is undesirable to reduce the number of digitized bits to an extremely small number. When the number of digitized bits is eight, the video signal can have 256 (0 to 255) levels. However, in a stationary portion, excluding any unstationary portion such as an outline or the like of an object, the level distribution of the picture elements of one block is concentrated within a fairly narrow range. In the case of a video signal, since there is correlation among the picture elements in one three-dimensional (hereinafter, simply referred to as 3D) block, the dynamic range DR in the stationary portion is not so wide. It is sufficient to consider the maximum value to be about 128. Therefore, even if the number of digitized bits of the coding code is set to four as previously mentioned above, an increase in digitization distortion can be prevented.

Namely, in the worst case, the dynamic range DR is 128. Even in this case, when the number of digitized bits is four, the divisional level unit is 8 and the digitization distortion is 4. The digitization distortion of such a value cannot be visually discriminated. On the contrary, although the change width is widened in the unstationary portion, according to the present invention since the dynamic range DR is adaptively determined, a deterioration of response in the transient portion does not occur.

Figures 3, 4, 5:
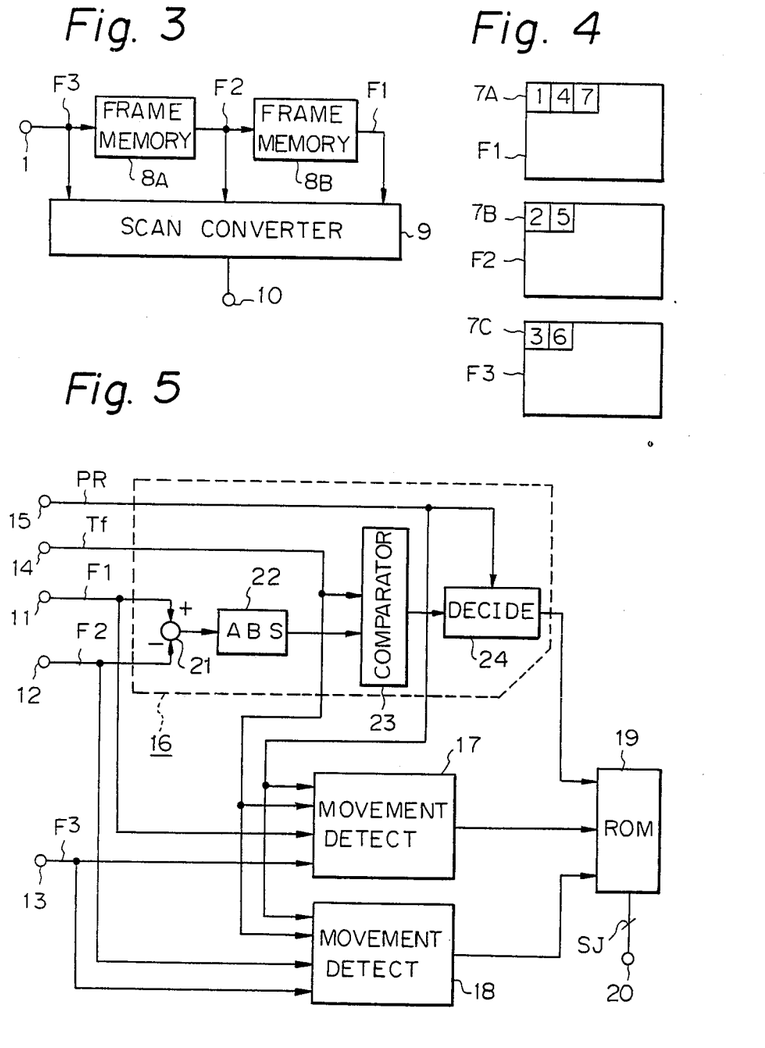
FIGS. 3 and 4 are respectively a diagram showing an example of an arrangement of a block formation circuit and a schematic diagram for explaining this circuit.
FIG. 5 is a block diagram of an example of a movement discriminating circuit.

FIG. 3 shows an example of an arrangement of the block formation circuit 2. Frame memories 8A and 8B are cascade connected to the input terminal 1. The picture element data of the current frame $F_3$ and the picture element data of the preceding two frames $F_2$ and $F_1$ of the current field which are respectively taken out of the frame memories 8A and 8B are supplied to a scan converter 9. The picture element data in the corresponding 2D regions 7A, 7B, and 7C among three frames is sequentially obtained at an output terminal 10 of the scan converter 9. Namely, as shown in FIG. 4, the picture element data in the corresponding regions 7A, 7B, and 7C among the three continuous frames $F_1$ to $F_3$ is sequentially output in accordance with the order indicated by numerals. In each region, the data is output in accordance with the scanning order.

FIG. 5 shows an example of the movement discriminating circuit 3. In FIG. 5, reference numerals 11, 12, and 13 denote input terminals to which the video data of three frames $F_1$, $F_2$, and $F_3$ in one block is supplied, respectively. This input data is formed by converting the output data of the block formation circuit 2 into the parallel data for every block. The video data of each frame, threshold value data Tf from a terminal 14, and a reset pulse PR from a terminal 15 are supplied to movement detecting circuits 16, 17, and 18, respectively.

The movement detecting circuit 16 detects the movement of the image between the region 7A of the frame $F_1$ and the region 7B of the frame $F_2$. The movement detecting circuit 17 detects the movement of the image between the region 7A of the frame $F_1$ and the region 7C of the frame $F_3$. The movement detecting circuit 18 detects the movement of the image between the region 7B of the frame $F_2$ and the region 7C of the frame $F_3$. The movement detecting circuits 16 to 18 are similarly constituted except for receiving the input video data. Therefore, in FIG. 5, a practical arrangement regarding only the movement detecting circuit 16 is shown. The one-bit output signals of the movement detecting circuits 16 to 18 are supplied to an ROM (Read Only Memory) 19. The two-bit discriminating signal SJ which was read out of the ROM 19 is taken out at an output terminal 20.

The movement detecting circuit 16 comprises a subtracter 21, an absolute value producing circuit 22, a comparator 23, and a deciding circuit 24. The absolute value of the level difference (frame difference) of the picture elements existing at the corresponding positions between the regions 7A and 7B is produced by the subtracter 21 and absolute value producing circuit 22. The absolute value of the frame difference is compared with the threshold value data Tf by the comparator 23.

The binary comparison output corresponding to the level difference between the absolute value of the frame difference and the threshold value data Tf is supplied to the deciding circuit 24. When the absolute values of the frame differences with respect to all of the picture elements included in the regions 7A and 7B of the frames $F_1$ and $F_2$ are below the threshold value data Tf, the deciding circuit 24 determines that there is no change between the regions 7A and 7B, namely, these regions are still portions. The reset pulse PR for every block is supplied to the deciding circuit 24. The one-bit output from the deciding circuit 24 is supplied to the ROM 19.

In a manner similar to the above, the change between the regions 7A and 7C is also detected by the movement detecting circuit 17, and the change between the regions 7B and 7C is detected by the movement detecting circuit 18. The ROM 19 generates the two-bit discriminating code SJ from the respective output signals of the movement detecting circuits 16 to 18. The discriminating code SJ is defined as follows. Symbols A, B, and C denote the contents of the images.

| SJ | 7A | 7B | 7C |
|----|----|----|----|
| 00 | A  | A  | A  |
| 01 | A  | B  | B  |
| 10 | A  | A  | B  |
| 11 | A  | B  | C  |

When (SJ=00), the images in the regions in the block of the frames $F_1$, $F_2$, and $F_3$ are the same. Therefore, for example, only the coding code DT in the region 7B of the frame $F_2$ in one block is coded. The average value of the data in the regions 7A to 7C may be also transmitted. When (SJ=01) or (SH=10), one of the same images in two regions can be omitted without transmitting it. The average value of the data in the regions which have been determined to have the same image may be also transmitted. When (SJ=11), the coding codes of all picture elements in one block need to be transmitted.

The picture elements of the frame which do not need to be transmitted are removed by a gate circuit or the like on the basis of the discriminating code SJ, or an average value producing circuit is made operative by the discriminating code SJ. Therefore, in the encoder block 4, a predetermined coding process is performed in accordance with the content of the discriminating code SJ. The discriminating code SJ is supplied to the encoder block 4, thereby instructing which frame in one block should be removed or which coding process should be executed.

As described above, by checking the presence or absence of a still portion for every block, the transmission of the coding codes concerned with the still portions which occupy a large ratio in the image can be made unnecessary. Thus, the compression rate of data can be fairly raised.

Figure 6:
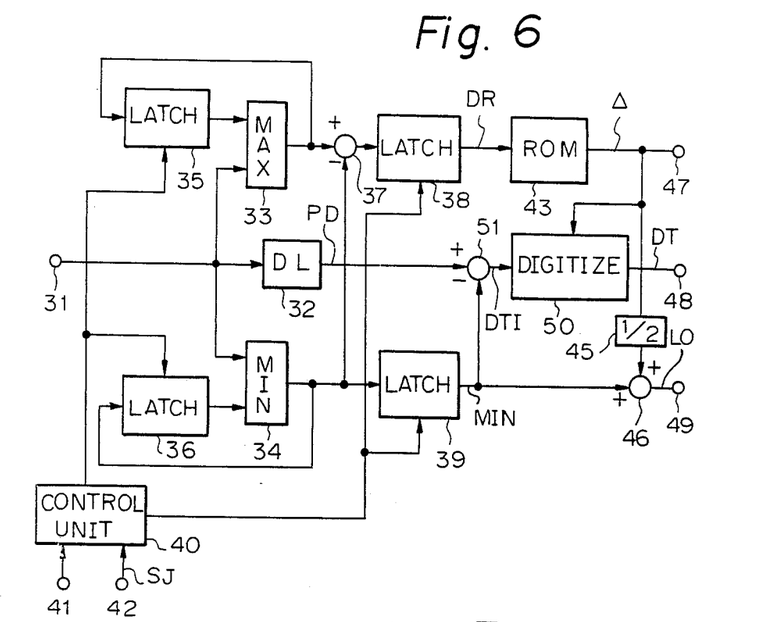
FIG. 6 is a block diagram of an example of an encoder block.

FIG. 6 shows an arrangement of an example of the encoder block 4. The video data in the region which needs to be coded is sequentially supplied from the movement discriminating circuit 3 to an input terminal 31 for every block as mentioned before. The picture element data from the input terminal 31 is supplied to a delay circuit 32 and selecting circuits 33 and 34. The selecting circuit 33 selects and outputs the data having the larger level between the picture element data of the input digital video signal and the output data of a latch 35. The selecting circuit 34 selects and outputs the data having the smaller level between the picture element data of the input digital video signal and the output data of a latch 36.

The output data of the selecting circuit 33 is supplied to a subtracter 37 and latched into the latch 35. The output data of the selecting circuit 34 is supplied to the subtracter 37 and a latch 39 and latched into the latch 36. A latch pulse is supplied from a control unit 40 to the latches 35 and 36.

A sampling clock synchronized with the input digital video signal and timing signals such as a sync signal and the like are supplied from a terminal 41 to the control unit 40. The discriminating code SJ is supplied from an input terminal 42 to the control unit 40. The control unit 40 supplies a latch pulse to the latches 35, 36, 38, and 39 at desired timings.

The contents of the latches 35 and 36 are initialized at the beginning of each block. The data of all "0" bits is initialized into the latch 35. The data of all "1" bits is initialized into the latch 36. The data having the maximum level in the picture element data in the same block which is sequentially supplied is stored into the latch 35. The data having the minimum level in the picture element data in the same block which is sequentially supplied is stored into the latch 36.

After the detection of the maximum and minimum levels is finished with respect to one block, the maximum level in this block is output from the selecting circuit 33. On the contrary, the minimum level in this block is output from the selecting circuit 34. After completion of the detection with regard to one block, the latches 35 and 36 are again initialized.

The subtracter 37 obtains the dynamic range DR of each block by subtracting the minimum level MIN from the selecting circuit 34 from the maximum level MAX from the selecting circuit 33. The dynamic range DR is output from the subtracter 37. The dynamic range DR and the minimum level MIN are latched into the latches 38 and 39 by the latch pulse from the control unit 40, respectively.

The dynamic range DR stored in the latch 38 is supplied to an ROM 43. The ROM 43 divides the dynamic range DR in accordance with the number of bits of the coding code, thereby generating the digitization width $\Delta$. Namely, the address of eight bits is supplied to the ROM 43. The digitization width $\Delta$ (four bits) which is derived by dividing the 8-bit address into 1/16 ths and rounding the resultant value to the nearest whole number is read out of the ROM 43. The digitization width $\Delta$ is taken out at an output terminal 47 and supplied to a digitizing circuit 50.

The minimum level MIN stored in the latch 39 is supplied to an adder 46 and to one input terminal of a subtracter 51. An input digital video signal PD derived through a delay circuit 32 is supplied to the other input terminal of the subtracter 51. Therefore, the data DTI after the minimum level is removed is output from the subtracter 51 and supplied to the digitizing circuit 50. The digitizing circuit 50 has a constitution as described hereinafter. The coding code DT of four bits is taken out at an output terminal 48.

Data equal to $\frac{1}{2}$ of the digitization width $\Delta$ is supplied to the other input terminal of the adder 46 through a $\frac{1}{2}$ multiplier 45. The representative minimum level $L_0$ which is output from the adder 46 is taken out at an output terminal 49.

In the foregoing example, the digitization width $\Delta$, representative minimum level $L_0$, and discriminating code SJ have been transmitted as additional codes. However, the invention is not limited to these codes, as for example the dynamic range information DR, minimum level MIN, and discriminating code SJ may be also transmitted. In this case, sixteen bits (8 bits + 8 bits) are needed as the additional bits.

Figure 7:
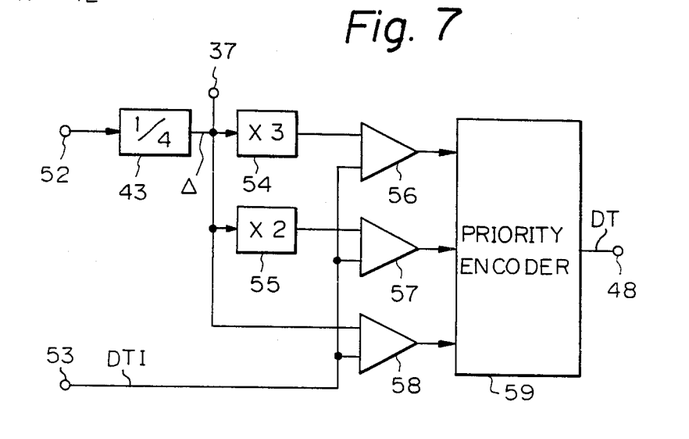
FIG. 7 is a block diagram of an example of a digitizing circuit.

FIG. 7 shows an arrangement of an embodiment of the ROM 43 and digitizing circuit 50 mentioned above. For simplicity of explanation, the number of digitized bits is set to two bits instead of four bits and the dynamic range is divided into four.

In FIG. 7, the signal indicative of the dynamic range DR is supplied to an input terminal 52. The data DTI after the minimum level is removed is supplied to an input terminal 53. The level of the dynamic range DR is reduced by $\frac{1}{4}$ by the ROM 43 and the digitization width $\Delta$ is read out of the ROM 43.

The output of the ROM 43 is supplied to multipliers 54 and 55. This output is tripled by the multiplier 54. The output of the multiplier 54 is supplied to one input terminal of a level comparator 56. The output from the ROM 43 is doubled by the multiplier 55. The output of the multiplier 55 is supplied to one input terminal of a level comparator 57. The output of the ROM 43 is also supplied to one input terminal of a level comparator 58. The data DTI after the minimum level is removed is supplied to the other input terminals of the level comparators 56, 57, and 58, respectively.

Assuming that the outputs of the level comparators 56, 57, and 58 are $C_1$, $C_2$, and $C_3$, respectively, the outputs $C_1$ to $C_3$ change as follows in accordance with the level of the data DTI.

(1) When ($\frac{3}{4}$) DR$\leq$DTI$\leq$DR, $C_1$="1", $C_2$="1", $C_3$="1"
(2) When (2/4) DR$\leq$DTI<($\frac{3}{4}$) DR, $C_1$="0", $C_2$="1", $C_3$="1"
(3) When ($\frac{1}{4}$) DR$\leq$DTI<(2/4) DR, $C_1$="0", $C_2$="0", $C_3$="1"
(4) When 0$\leq$DTI<($\frac{1}{4}$) DR, $C_1$="0", $C_2$="0", $C_3$="0"

The outputs $C_1$ to $C_3$ of the level comparators 56, 57, and 58 are supplied to a priority encoder 59. The two-bit coding code DT is derived at the output terminal 48 by the priority encoder 59. The priority encoder 59 generates the coding code of (11) in the above case (1); the coding code of (10) in the above case (2); the coding code of (01) in the above case (3); and the coding code of (00) in the above case (4), respectively.

Figure 8:
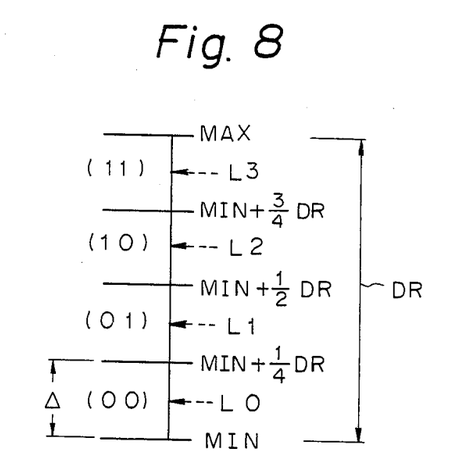
FIGS. 8 and 9 are schematic diagrams for explaining examples of digitization.

As shown in FIG. 8, the picture element data PD including the minimum level MIN in one block belongs to the level within the dynamic range DR from the minimum level MIN to the maximum level MAX. The ROM 43 outputs the digitization width $\Delta$ which is derived by dividing the dynamic range DR into four equal parts. To which level range divided the data DTI after the minimum level was removed belongs is determined by the level comparators 56, 57, and 58 and converted into the two-bit coding code DT corresponding to this level range. The representative minimum level $L_0$ is calculated by adding ($\frac{1}{2}$) $\Delta$ to the minimum level MIN. The digitization width $\Delta$, representative minimum level $L_0$, and coding code DT are transmitted.

In this embodiment, as will be obvious from FIG. 8, the dynamic range DR is divided into equal parts by the digitization width $\Delta$ and the center values $L_0$, $L_1$, $L_2$, and $L_3$ of each region are used as the values upon decoding. The above-described coding method can reduce the digitization distortion.

On the other hand, two picture element data having the minimum level MIN and the maximum level MAX certainly exist in one block. Therefore, to increase the number of coding codes having no error, as shown in FIG. 9, it is sufficient to divide the dynamic range DR into ($2^m-1$) parts (where, m denotes the number of digitized bits), to set the minimum level MIN to the representative minimum level $L_0$, and to set the maximum level MAX to the representative maximum level $L_3$.

Figure 9:
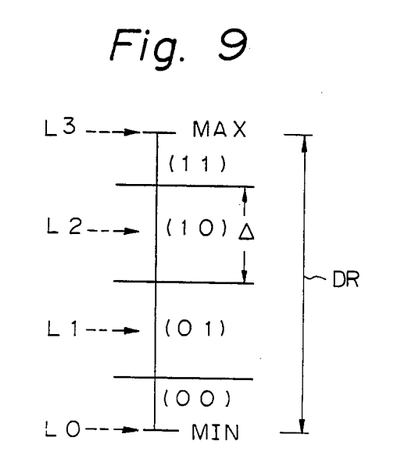

In the case of performing the digitization shown in FIG. 9, the minimum level MIN is directly output as the representative minimum level $L_0$ and the ROM 43 performs the division of (1/15).

The digitizing circuit 50 is not limited to the constitution shown in FIG. 7 but may be also constituted in a manner such that a digital divider is used and the digitization width $\Delta$ is supplied as the denominator to the digital divider and the data DTI after removal of the minimum level is supplied as the numerator to the digital divider. This digital divider generates a two-bit output corresponding to this value (of which the fractions below the decimal point are omitted) as the coding code.

Figure 10:
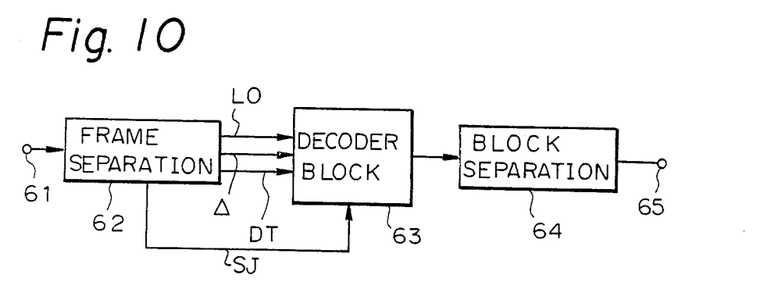
FIG. 10 is a block diagram showing an arrangement of a reception side for the embodiment of FIG. 1.

FIG. 10 shows an arrangement on the reception (or reproducing) side. The reception data from an input terminal 61 is supplied to a frame separation circuit 62. The frame separation circuit 62 separates the input reception data into the coding code DT, additional codes $\Delta$ and $L_0$, and discriminating code SJ and also performs the error correcting process. The coding code DT and additional codes of four bits are supplied to a decoder block 63.

The decoder block 63 executes the process opposite to that in the encoder block 4 on the transmission side. Namely, the eight-bit data DTI after the minimum level is removed is formed. The data DTI and the eight-bit representative minimum level $L_0$ are added, so that the original picture element data PDI is decoded. The output data PDI of the decoder block 63 is supplied to a block separation circuit 64. The block separation circuit 64 converts the decoded data according to the order of the block into an data based on the order similar to the scanning order of the video signal in a manner opposite to the block formation circuit 2 on the transmission side. The original video signal is decoded and output to an output terminal 65 of the block separation circuit 64.

In the decoder block 63, the picture element data in the omitted region is added using the discriminating code SJ. When (SJ=00), the same picture elements as those in one decoded region, e.g., region 7B, are inserted as the picture elements in the regions 7A and 7C, respectively. When (SJ=01) or (SJ=10), the picture elements in one decoded region are inserted as the picture elements in the other omitted region.

In the above description, the coding code DT, digitization width Δ, and representative minimum level $L_0$ have been transmitted. However, in place of the digitization width Δ, the dynamic range DR may be also transmitted as the additional code. Either one of the digitization width Δ and the dynamic range DR and the representative maximum level may be also transmitted.

On the other hand, the data in one block can be also simultaneously taken out by a combination circuit consisting of a frame memory, a line delay circuit, and a sample delay circuit.

Further, the movement discriminating circuit 3 may be also arranged between the encoder block 4 and the frame formation circuit 5. In this case, the movement discriminating circuit 3 discriminates the presence or absence of the still portion from the result of the discrimination regarding the coincidence or dissonance of the coding code of four bits.

A one-bit code can be also used as the discriminating code SJ. For example, when the discriminating code SJ is "0", the presence of the still portion is decided. When the discriminating code SJ is "1", the absence of the still portion is determined.

Figure 11:
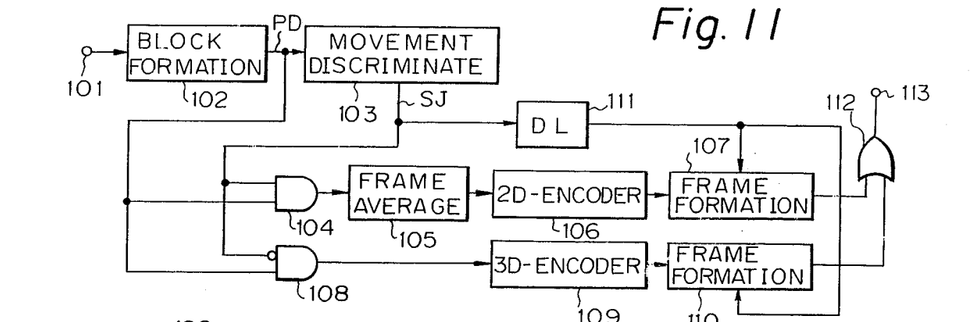
FIG. 11 is a block diagram of another embodiment of the invention.

With reference to FIG. 11, an explanation will now be made with regard to the example in which when the data of the continuous frames in the same block is determined to be identical by the movement discriminating circuit 3, the average value of the data of the frames is transmitted instead of transmitting the data of the first frame. In this example, a three-dimensional (3D) block consisting of (6 lines×6 picture elements×2 frames) will be considered. Therefore, the code of one bit indicative of the presence or absence of the movement may be used as the discriminating code SJ.

According to the embodiment, the amount of data to be transmitted can be sufficiently reduced as compared with the original data and the transmission band can be narrowed. The embodiment has the advantages such that in the stationary portion in which the change width of picture element data is small, the original picture element data can be almost completely reconstituted from the reception data and the picture quality hardly deteriorates. Further, in this embodiment, since the dynamic range is determined in correspondence to each block, a good response is derived in the transient portion such as an edge or the like in which the change width is large. In addition, the data can be compressed on a three-dimensional unit basis.

Another embodiment of the invention will now be described.

FIG. 11 is a block diagram showing another embodiment. In FIG. 11, a digital video signal is input from an input terminal 101 to a block formation circuit 102. The input digital video signal from the block formation circuit 102 is supplied to a movement discriminating circuit 103 and AND gates 104 and 108. The discriminating code SJ from the movement discriminating circuit 103 is supplied to the other input terminal of the AND gate 104, while the inverted signal of the discriminating code SJ is supplied to the other input terminal of the AND gate 108. The picture element data of a still block is separated by the AND gate 104 and supplied to a frame average producing circuit 105. The frame average producing circuit 105 calculates the average value of one of 36 picture elements at an arbitrary position in one region and one of 36 picture elements at the same arbitrary position in another region, these two regions constituting the block. In this manner, the frame average producing circuit 105 similarly calculates a total of 36 average values with respect to every 36 picture elements in those two regions and outputs these 36 average values in place of the picture element data of the block. Therefore, the output signal of the circuit 105 has the constitution of a 2D block in which the average values are arranged at (6 lines×6 picture elements). The output signal of the circuit 105 is supplied to a two-dimensional (2D) encoder 106.

The AND gate 108 separates the video data of a block having movement of image and supplies this picture element data to a three-dimensional (3D) encoder 109. In the 2D-encoder 106 and 3D-encoder 109, a coding process in which the number of bits can be changed in accordance with the dynamic range for every block is performed as will be explained hereinafter. The dynamic range DR and the minimum level MIN of the block and the code signal DT of 0 to 5 bits are derived from the encoders 106 to 109.

The output signals of the 2D and 3D encoders 106 and 109 are supplied to frame formation circuits 107 and 110, respectively. In this embodiment, the discriminating code SJ, code signal DT, dynamic range DR, and minimum level MIN are transmitted and converted into the transmission data by the frame formation circuits 107 and 110. The output signals of the frame formation circuits 107 and 110 are supplied to an OR gate 112 and the transmission data is taken out at an output terminal 113. Although not shown, this transmission data is transmitted or recorded in the recording medium as the serial data. Numeral 111 denotes a delay circuit.

Figure 12:
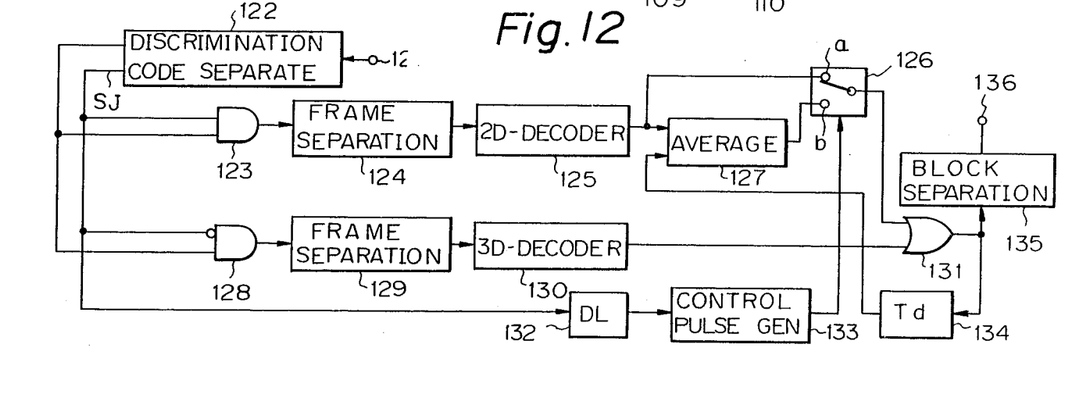
FIG. 12 is a block diagram showing an arrangement of a reception side for the embodiment of FIG. 11.

FIG. 12 shows an arrangement of the reception side corresponding to the transmission side shown in FIG. 11.

In FIG. 12, the reception data from an input terminal 121 is supplied to a discrimination code separating circuit 122, by which the discriminating code SJ is separated. The additional data and code signal other than the discriminating code SJ are supplied to AND gates 123 and 128. The discriminating code SJ is supplied as another input signal to the AND gate 123. The inverted signal of the discriminating code SJ is supplied as another input signal to the AND gate 128.

The AND gate 123 separates out the code signal and additional data of the average value information of the still block. This average value information is supplied to a frame separation circuit 124. The code signal and additional data of the block having movement which are separated by the AND gate 128 are supplied to a frame separation circuit 129. The code signal DT and the additional codes DR and MIN are separated by the frame separation circuits 124 and 129 and at the same time the error correcting process is executed. The code signal DT and additional codes are supplied to a two-dimensional (2D) decoder 125 and a three-dimensional (3D) decoder 130, respectively.

The decoders 125 and 130 execute processes opposite to those executed by the encoders 106 and 109 on the transmission side. Namely, the eight-bit data DTI after the minimum level is removed is reconstituted as the representative level. This data DTI and the eight-bit minimum level MIN are added and the original picture element data is reconstituted.

In the 2D-decoder 125, the decoded output in the omitted region is formed. The output signal of the 2D-decoder 125 is supplied to one input terminal a of a switching circuit 126 and to an average value producing circuit 127. The output signal of the average value producing circuit 127 is supplied to the other input terminal b of the switching circuit 126. The output signal of the switching circuit 126 is supplied to an OR gate 131. The output signal of the 3D-decoder 130 is supplied to the other input terminal of the OR gate 131. The output signal of the OR gate 131 is supplied to a block separation circuit 135 and a delay circuit 134 (having a delay amount of Td). The output signal of the delay circuit 134 is supplied to the average value producing circuit 127.

The switching circuit 126, average value producing circuit 127, and delay circuit 134 which are arranged between the output signal of the 2D-decoder 125 and the OR gate 131 function to prevent the occurrence of jerkiness (unnatural movement) in the reproduced image. A signal to control the switching circuit 126 is generated from a control pulse generator 133. The discriminating code SJ is supplied to the generator 133. Numeral 132 denotes a delay circuit.

The block separation circuit 135 converts the decoded data according to the order in the block into data based on an order similar to the scanning order of the video signal in a manner opposite to the process by the block formation circuit 102 on the transmission side. The original digital video signal is taken out at an output terminal 136 of the block separation circuit 135.

The operation to prevent jerkiness on the transmission and reception sides shown in FIGS. 11 and 12 will now be described hereinbelow with reference to FIGS. 13 and 14.

Figure 13:
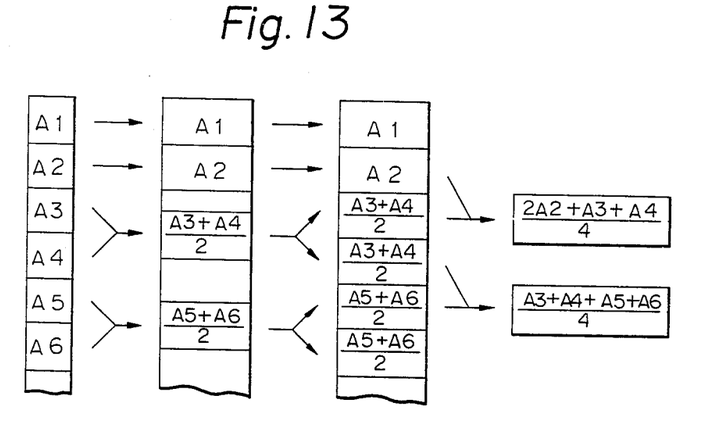
FIG. 13 is a schematic diagram for explaining the encoding and decoding operations.

FIG. 13 shows examples of the encoding and decoding operations in this embodiment.

$A_1$ and $A_2$ denote regions which belong to two frames which are continuous with regard to the time, respectively. One block is constituted by both regions $A_1$ and $A_2$. Similarly, one block is constituted by a pair of regions $A_3$ and $A_4$, and one block is also constituted by a pair of regions $A_5$ and $A_6$, respectively.

When the block consisting of the regions $A_1$ and $A_2$ is a movement block, all of the picture elements included in the regions $A_1$ and $A_2$ are coded by the 3D encoder 109 in accordance with the dynamic range. When the block consisting of the regions $A_3$ and $A_4$ is a still block, the average value $(A_3+A_4)/2$ between the frames which is output from the frame average producing circuit 105 is coded by the 2D-encoder 106 in accordance with the dynamic range. Similarly, when the block consisting of the regions $A_5$ and $A_6$ is a still block, the average value $(A_5+A_6)/2$ between the frames which is output from the circuit 105 is coded by the 2D-encoder 106 in accordance with the dynamic range. Therefore, with regard to each still block, the picture element data in two regions is reduced to the average value of the number equal to the picture element data in one region.

On the reception side, with respect to each block having movement, the decoding operation is performed by the 3D-decoder 130, so that the picture element data of the block consisting of the regions $A_1$ and $A_2$ is reproduced. However, with regard to the first still block, the average value $(A_3+A_4)/2$ between the frames is decoded and at the same time, this average value is set as the data in each region of two continuous frames.

In the simple OR output between two decoded outputs of the 2D-decoder 125 and 3D-decoder 130 obtained as mentioned above, the movement of the object in the image is discontinuous between the region of the data of the frame average value and the preceding region in another block, so that the unnatural movement (i.e., jerkiness) occurs.

In the example of FIG. 13, the smoothing process is performed to prevent jerkiness when shifting from a preceding block in time to a region of the frame average value in the still block. Namely, as shown in FIG. 13, when shifting from the region $A_2$ in the preceding block to the region $(A_3+A_4)/2$ of the frame average value, the average value $(2A_2+A_3+A_4)/4$ between the data of the region of the frame average value and the data in the region in the preceding block is used in place of the data of $(A_3+A_4)/2$. Similarly, the data of $(A_3+A_4+A_5+A_6)/4$ is used in place of the data $(A_5+A_6)/2$ in the next block located at the boundary with the preceding block.

Between the continuous different blocks with respect to time, the image in which the video data in the preceding and current blocks mixedly exists is generated by the foregoing smoothing process, so that jerkiness is reduced.

Figure 14A:
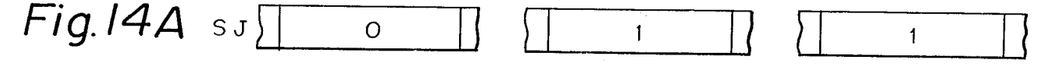
Figure 14B:
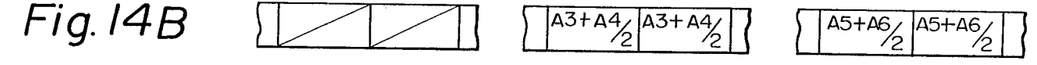
Figure 14C:
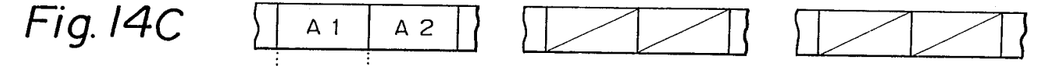
Figure 14D:
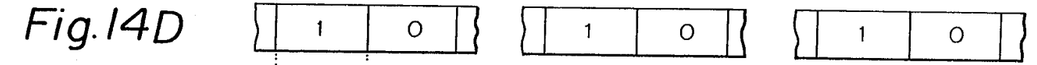
Figure 14E:
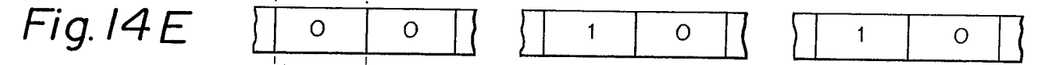
Figures 14F, 14G:
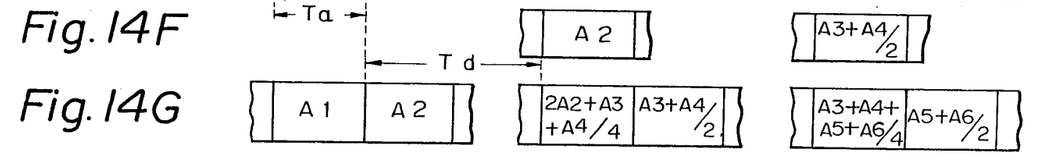

The operation to reduce the jerkiness on the reception side shown in FIG. 12 will now be described with reference to FIG. 14.

FIG. 14, A, shows the received discriminating code SJ. The discriminating code SJ varies synchronously with the change in the block on the reception side. FIG. 14, B, shows the decoded data which is produced by the 2D-decoder 125. FIG. 14, C, denotes the decoded data which is formed by the 3D-decoder 130. Similarly to FIG. 13, only the processes in the regions $A_1$ to $A_6$ are shown in FIG. 14. The regions $A_1$ to $A_6$ belong to three time-continuous frames.

In the control pulse generator 133 (refer to FIG. 12), the control pulse which is at a high level correspondence to the beginning region in the still block as shown in FIG. 14, E, is formed from the discriminating signal SJ (FIG. 14, A) and the timing signal whose high or low level alternately changes synchronously with the reproduced data in two regions constituting one block as shown in FIG. 14, D. The switching circuit 126 is controlled by this control pulse. When the control pulse is at a low level, the switching circuit 126 selects the decoded output of the 2D-decoder 125 which is supplied to the input terminal a. On the contrary, when the control pulse is at a high level, the switching circuit 126 selects the output signal of the average value producing circuit 127 which is supplied to the input terminal b.

On the other hand, the delay amount Td of the delay circuit 134 is set to (Td=7 Ta) assuming that the period of one region is Ta. Therefore, as shown in FIG. 14, F, the output signal of delay circuit 134, which is the output signal of the OR gate 131 as delayed, is generated and supplied to the average value producing circuit 127. The switching circuit 126 is controlled by the control pulse from the control pulse generator 133 and the decoded output which was subjected to the smoothing process when shifting to the still block is derived from the OR gate 131 as shown in FIG. 14, G.

Figure 15:
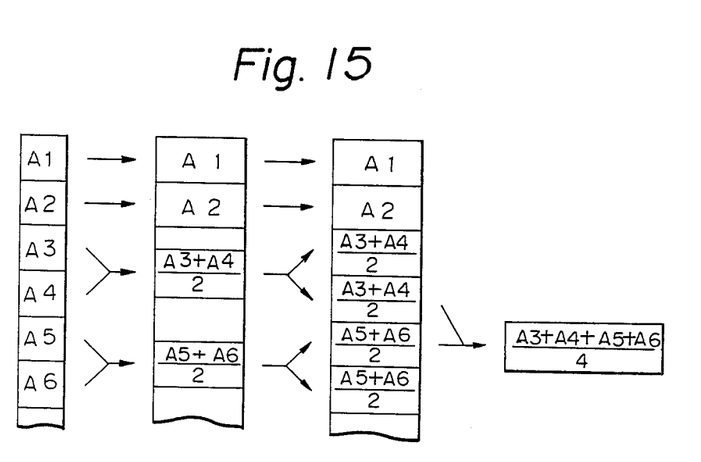
FIG. 15 is a schematic diagram for explaining another example of the encoding and decoding operations.

Although the smoothing processes have been executed among all of the blocks in the foregoing embodiment, in particular, jerkiness causes a problem in the case where, for example, a special block consisting of the first and second frames is a still block and the corresponding block consisting of the subsequent third and fourth frames is also a still block. Therefore, for example, as shown in a further embodiment, in FIG. 15, in the case where the block consisting of the regions $A_1$ and $A_2$ is an animation block (i.e., movement block) and the block consisting of $A_3$ and $A_4$ of the next two frames is a still block, the output of the region $A_3$ is not subjected to the smoothing process. Further, when the block consisting of the next regions $A_5$ and $A_6$ is a still block, the average value is calculated from the data in the block consisting of $A_3$ and $A_4$ and the data in the block consisting of $A_5$ and $A_6$ by the smoothing process, and this average value may be used in place of the output in the region $A_5$.

Namely, only when the target block is determined to be a still block by the discriminating code SJ and the time-preceding corresponding block is a still block is the data in a desired region of the beginning frame or field in the relevant block obtained by calculating the average value together with the data in the region of the last frame or field in the preceding block.

Although the present invention has been shown and described with respect to preferred embodiments, various changes and modifications which are obvious to a person skilled in the art to which the invention pertains are deemed to lie within the spirit and scope of the invention.

What is claimed is:

1. A high efficiency coding apparatus for coding digital video data in a block format allowing compression of the video data, each block of data including digital video data representing a three dimensional group of picture elements, said coding apparatus comprising;

first detecting means for detecting a maximum value of the digital video data of said three dimensional group of picture elements in said block;

second detecting means for detecting a minimum value of the digital video data of said three dimensional group of picture elements in said block;

means for generating dynamic range information of the block from said maximum and minimum values;

means for subtracting said minimum value from each of the digital video data of said three dimensional group of picture elements in said block to generate modified digital video data;

movement discriminating means for discriminating the existence of movement in each block and generating a discriminating code;

means for encoding said modified digital data using a smaller number of bits than a corresponding number of bits of said modified digital data, said encoding means being controlled by said discriminating code; and transmitting means for transmitting the output of said encoding means and an additional code for each said block formed of said discriminating code and at least two of said maximum value, said minimum value, and a signal based on said dynamic range information.

2. A high efficiency coding apparatus according to claim 1, wherein said encoding means encodes the modified digital data of one video field when said discriminating code indicates that no movement exists in said block.

3. A high efficiency coding apparatus according to claim 1, wherein said encoding means includes averaging means for averaging the digital data of plural video fields, the output of said averaging means being encoded when said discriminating code indicates that no movement exists among said plural video fields.

4. A high efficiency coding apparatus according to claim 1, wherein said movement discriminating means includes a level comparator for comparing digital data of a picture element in a first video field and digital data of a corresponding picture element in a second video field, absolute value generating means supplied with the output of said level comparator for generating the absolute value of said output, comparator means for comparing the output of said absolute value generating means with a reference value and output discriminating means for discriminating the output of said comparator means.

5. A decoding apparatus for decoding data transmitted by a coding apparatus for coding digital video data in a block format allowing compression of the video data representing a three dimensional group of picture elements and having first detecting means for detecting a maximum value of the digital video data of said picture elements in each block, second detecting means for detecting a minimum value of the digital video data of said picture elements in said block, means for generating dynamic range information of the block from said maximum and minimum values, means for subtracting said minimum value from each of the digital video data of said picture elements in said block to generate modified digital video data, movement discriminating means for discriminating the existence of movement in each block and generating a discriminating code, means for encoding said modified digital data using a smaller number of bits than a corresponding number of bits of said modified digital data, said encoding means being controlled by said discriminating code, and transmitting means for transmitting the output of said encoding means and an additional code for each said block formed of said discriminating code and at least two of said maximum value, said minimum value, and a signal based on said dynamic range information, said coding apparatus comprising;

separating means for separating said discriminating code from said transmitted data;

means for regenerating said minimum value from said additional code;

decoding means supplied with said discriminating code and said encoded data for decoding the encoded data to generate said modified data; and adder means for adding the minimum value to each of the modified data from said decoding means.

6. A decoding apparatus according to claim 5, wherein said decoding means includes first and second means to which said transmitted data is supplied and to which said discriminating code is also supplied as a control signal, first and second decoder means connected to said first and second gate means, respectively, and combining means for combining outputs of said first and second decoder means.

7. A decoding apparatus according to claim 6, wherein said first decoder means generates the same decoded data for the corresponding picture elements in plural video fields.

8. A decoding apparatus according to claim 7, wherein said first decoder means includes filtering means made operative while the digital video data of picture elements in the beginning field of the block is generated.

9. A decoding apparatus according to claim 8, wherein said filtering means includes an averaging circuit for averaging the digital video data of picture elements in the beginning field of the block and digital video data of the corresponding picture elements in the field preceding said beginning field of the block.

* * * * *

UNITED STATES PATENT AND TRADEMARK OFFICE
CERTIFICATE OF CORRECTION

PATENT NO. : 4,729,021
DATED : March 1, 1988
INVENTOR(S) : Tetsujiro Kondo

It is certified that error appears in the above-identified patent and that said Letters Patent is hereby corrected as shown below:

Column 1, line 56, change "809,742" to --06/809,742--;
        line 65, delete "such".
Column 4, line 14, change "(x6x3)" to --(6x6x3)--.
Column 5, line 4, delete "the", third occurence.
Column 7, line 34, change "terminal" to --terminal--
Column 10, line 54, delete "the", second occurence.
Column 12, line 45, delete "the", first occurence;
        line 58, after "level" insert --in--.

IN CLAIMS:

Column 15, line 3, before "means" insert --gate--.

Signed and Sealed this

Fifteenth Day of November, 1988

Attest:

DONALD J. QUIGG

Attesting Officer      Commissioner of Patents and Trademarks